(12) United States Patent
Akiyama

(10) Patent No.: US 8,123,366 B2
(45) Date of Patent: Feb. 28, 2012

(54) LIGHT SOURCE WITH TRUNCATED ELLIPSOIDAL REFLECTOR

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 692 days.

(21) Appl. No.: 12/194,171

(22) Filed: Aug. 19, 2008

(65) Prior Publication Data
US 2009/0051886 A1    Feb. 26, 2009

(30) Foreign Application Priority Data
Aug. 24, 2007   (JP) .................. 2007-217998

(51) Int. Cl.
*G03B 21/28*   (2006.01)
*F21V 7/08*   (2006.01)
(52) U.S. Cl. ..................... 353/98; 362/296.06
(58) Field of Classification Search ............ 353/85, 353/98–99, 122; 362/296, 310, 296.01, 296.06, 362/341, 347; 349/67
See application file for complete search history.

(56) References Cited

U.S. PATENT DOCUMENTS

| | | | |
|---|---|---|---|
| 5,607,229 A * | 3/1997 | Rykowski et al. | 362/346 |
| 5,927,849 A * | 7/1999 | Cassarly et al. | 362/551 |
| 2005/0068507 A1 * | 3/2005 | Akiyama | 353/102 |
| 2005/0157501 A1 | 7/2005 | Akiyama et al. | |
| 2006/0007521 A1 * | 1/2006 | Akiyama | 359/290 |
| 2006/0077666 A1 * | 4/2006 | Akiyama | 362/296 |
| 2009/0109396 A1 | 4/2009 | Kitani et al. | |

FOREIGN PATENT DOCUMENTS

| | | |
|---|---|---|
| JP | 01-166904 U | 11/1989 |
| JP | 2005-070429 A | 3/2005 |
| JP | 2007-065016 A | 3/2007 |
| WO | WO2004-020898 | 3/2004 |
| WO | WO-2005-036256 A | 4/2005 |
| WO | WO-2006-137489 A | 12/2006 |

* cited by examiner

*Primary Examiner* — Tony Ko
*Assistant Examiner* — Jori S Reilly-Diakun
(74) *Attorney, Agent, or Firm* — AdvantEdge Law Group, LLC

(57) ABSTRACT

An illumination device includes a light source device including an ellipsoidal reflector with a reflecting concave surface and a light emitting tube having an emission center in the vicinity of a first focal position of the ellipsoidal reflector, and defining a first focal position and a second focal position of the ellipsoidal reflector in a cross-sectional plane in a first virtual plane including a center axis of the ellipsoidal reflector as $F_1$ and $F_2$, respectively, and defining a first focal position and a second focal position of the ellipsoidal reflector in a cross-sectional plane in a second virtual plane including a center axis of the ellipsoidal reflector and perpendicular to the first virtual plane as $F_1'$ and $F_2'$, respectively, the ellipsoidal reflector has a rotationally asymmetrical concave shape having $F_1$ and $F_1'$ at the same position, and $F_2$ located between the $F_2'$ and the ellipsoidal reflector.

12 Claims, 9 Drawing Sheets

LIGHT SOURCE WITH TRUNCATED ELLIPSOIDAL REFLECTOR

BACKGROUND

1. Technical Field

The present invention relates to an illumination device and a projector.

2. Related Art

In general, projectors are each provided with an illumination device having a light source device that emits an illumination light beam, a liquid crystal light modulation device that modulates the illumination light beam from the illumination device (the light source device) in accordance with image information, and a projection optical system that projects the light modulated by the liquid crystal light modulation device on a projection surface such as a screen (see e.g., WO2004/20898).

The light source device has an ellipsoidal reflector and a light emitting tube having an emission center at the first focal point of the ellipsoidal reflector, and emits the light beam having the illumination light axis as the center axis thereof. Further, between the light source device and the area to be illuminated, there is disposed a concave lens, thus it is arranged to emit the light from the ellipsoidal reflector towards the posterior stage of the light path.

Incidentally, in association with downsizing of projectors in recent years, the demand of reducing the thicknesses of illumination devices has risen.

SUMMARY

An advantage of some aspects of the invention is to provide an illumination device and a projector, which can be made thinner than ever before.

As a result of a long faithful succession of development in order for achieving the advantage described above, the inventors of the invention have perceived that by using the ellipsoidal reflector with a rotationally asymmetrical concave shape having the first focal point ($F_1$) in a vertical cross-sectional plane and the first focal point ($F_1'$) in a horizontal cross-sectional plane identical to each other, and the second focal point ($F_2$) in the vertical cross-sectional plane positioned between the second focal point ($F_2'$) in the horizontal cross-sectional plane and the reflector, the vertical diameter size of the ellipsoidal reflector can be shortened, and at the same time, the vertical size of the optical system disposed at a posterior stage on the light path of the light source device can be shortened, and consequently, low-profiling compared to the past can be achieved, thus completing the present invention.

Therefore, an illumination device according to an aspect of the invention includes a light source device including an ellipsoidal reflector with a reflecting concave surface and a light emitting tube having an emission center in the vicinity of a first focal position of the ellipsoidal reflector, and defining a first focal position and a second focal position of the ellipsoidal reflector in a cross-sectional plane in a first virtual plane including a center axis of the ellipsoidal reflector as $F_1$ and $F_2$, respectively, and defining a first focal position and a second focal position of the ellipsoidal reflector in a cross-sectional plane in a second virtual plane including a center axis of the ellipsoidal reflector and perpendicular to the first virtual plane as $F_1'$ and $F_2'$, respectively, the ellipsoidal reflector has a rotationally asymmetrical concave shape having $F_1$ and $F_1'$ at the same position, and $F_2$ located between the $F_2'$ and the ellipsoidal reflector.

Therefore, according to this aspect of the invention, since the ellipsoidal reflector having the rotationally asymmetrical concave shape is provided, the diameter size of the ellipsoidal reflector in the cross-sectional plane in the first virtual plane becomes smaller than the diameter size of the ellipsoidal reflector in the cross-sectional plane in the second virtual plane, and thus, it becomes possible to make the size of the light source device in the direction (the direction perpendicular to the second virtual plane) along the first virtual plane smaller than the size of the light source device in the direction (the direction perpendicular to the first virtual plane) along the second virtual plane. In this case, assuming that the first virtual plane is the vertical plane and the second virtual plane is the horizontal plane, according to the illumination device of this aspect of the invention, since the vertical diameter size becomes smaller than the horizontal diameter size in the ellipsoidal reflector, it becomes possible to make the vertical size smaller than the horizontal size in the light source device. As a result, it becomes possible to make the thickness of the illumination device smaller (make the height of the illumination device smaller) than before.

Incidentally, in the case in which this aspect of the invention is applied to the illumination device having the optical system such as the concave lens or the overlapping lens disposed on the light exit side of the light source device (see FIGS. 6A and 6B described below), since $F_2$ is located between $F_2'$ and the ellipsoidal reflector, it becomes possible to make the size $d_1$ of the concave lens in the direction (the direction perpendicular to the second virtual plane) along the first virtual plane smaller than the size $d_1'$ of the concave lens in the direction (the direction perpendicular to the first virtual plane) along the second virtual plane. Further, regarding the optical system such as the overlapping lens disposed in the posterior stage of the concave lens, it becomes possible to make the size $d_2$ in the direction along the first virtual plane smaller than the size $d_2'$ in the direction along the second virtual plane. In this case, assuming that the first virtual plane is the vertical plane and the second virtual plane is the horizontal plane, according to the illumination device of this aspect of the invention, since the vertical diameter size becomes smaller than the horizontal diameter size in the concave lens and the optical system disposed in the posterior stage of the concave lens, it becomes possible to make the vertical size smaller than the horizontal size in the light source device. As a result, it becomes possible to make the thickness of the illumination device smaller (make the height of the illumination device smaller) than before.

In the illumination device according to this aspect of the invention, it is preferable that defining a diameter size of the ellipsoidal reflector in the cross-sectional plane in the first virtual plane as D, and defining a diameter size of the ellipsoidal reflector in the cross-sectional plane in the second virtual plane as D', the ellipsoidal reflector has a shape with a part of the reflecting concave surface is removed so as to satisfy D<D'.

By configuring the illumination device as described above, since the size in the direction (the direction perpendicular to the second virtual plane) along the first virtual plane in the light source device becomes further smaller than the size in the direction (the direction perpendicular to the first virtual plane) along the second virtual plane in the light source device, it becomes possible to make the thickness of the illumination device further smaller (the height of the illumination device further smaller) than before.

In the illumination device according to this aspect of the invention, it is preferable that the light source device further includes a secondary mirror or a reflecting film that reflects the light, which is emitted from the light emitting tube towards an area to be illuminated, towards the light emitting tube.

By configuring the illumination device as described above, since the light emitted from the light emitting tube towards the area to be illuminated is reflected towards the ellipsoidal reflector, it is not required to set the size of the ellipsoidal reflector so large as to cover the end of the light emitting tube on the side of the area to be illuminated, and thus, downsizing of the ellipsoidal reflector can be achieved, and as a result, low-profiling of the illumination device can be achieved.

Further, since the downsizing of the ellipsoidal reflector can be achieved, the focusing angle and the spot size of the beam focused from the ellipsoidal reflector towards the second focal position of the ellipsoidal reflector can be made smaller, thus the size of the optical system disposed in the posterior stage of the light source device can further be reduced, thereby achieving further downsizing of the illumination device.

In the illumination device according to this aspect of the invention, it is preferable that the light source device further includes a secondary mirror or a reflecting film that reflects the light, which is emitted from the light emitting tube towards an area to be illuminated, towards the light emitting tube, and the secondary mirror or the reflecting film is configured to reflect the light, which is emitted from the light emitting tube towards the removed part of the reflecting concave surface of the ellipsoidal reflector, towards the light emitting tube.

By thus configuring the illumination device, even in the case in which a part of the reflecting concave surface of the ellipsoidal reflector is removed in order for achieving downsizing of the illumination device, it becomes possible to prevent degradation of the light efficiency caused by the removal.

In the illumination device according to this aspect of the invention, it is preferable that a concave lens that emits the illumination light beam from the light source device towards an area to be illuminated is further provided, and defining refractive power of the concave lens in the first virtual plane as p, and defining refractive power of the concave lens in the second virtual plane as $\rho'$, $\rho > \rho'$ is satisfied.

Incidentally, focusing attention to the angle formed between the center axis of the light beam entering the concave lens and the illumination light axis, according to this aspect of the invention, since $F_2$ is located between $F_2'$ and the ellipsoidal reflector, the angle formed between the center axis of the light beam entering the concave lens and the illumination light axis in the first virtual plane becomes larger than the angle formed between the center axis of the light beam entering the concave lens and the illumination light axis in the second virtual plane. In this case, since the concave lens is arranged so that the refractive power of the concave lens in the first virtual plane is stronger than the refractive power of the concave lens in the second virtual plane, the light with relatively large angle is refracted with the strong refractive power while the light with relatively small angle is refracted with the weak refractive power, thus it becomes possible to substantially collimate the illumination light beam from the light source device efficiently.

In the illumination device according to this aspect of the invention, it is preferable that an integrator rod that converts the illumination light beam from the light source device into light having a more uniform in-plane light intensity distribution is further provided, and the integrator rod is configured to have a size of a light entrance surface of the integrator rod in a direction perpendicular to the first virtual plane larger than a size of the light entrance surface of the integrator rod in a direction perpendicular to the second virtual plane.

According to the illumination device of this aspect of the invention, since $F_2$ is located between $F_2'$ and the ellipsoidal reflector, it becomes possible to make the position of the light entrance surface of the integrator rod nearer to the ellipsoidal reflector. In other words, since the distance between the ellipsoidal reflector and the integrator rod can be shortened, the illumination device can be made smaller than before.

Incidentally, focusing attention to the spot size of the converging light from the ellipsoidal reflector, since $F_2$ is located between $F_2'$ and the ellipsoidal reflector, the spot size of the converging light from the ellipsoidal reflector in the second virtual plane becomes larger than the spot size of the converging light from the ellipsoidal reflector in the first virtual plane.

With respect to the ellipsoidal reflector from which the converging light is emitted, according to the illumination device related to this aspect of the invention, since the integrator rod configured so that the size of the light entrance surface of the integrator rod in the direction (the direction along the second virtual plane) perpendicular to the first virtual plane is larger than the size of the light entrance surface of the integrator rod in the direction (the direction along the first virtual plane) perpendicular to the second virtual plane is provided, it becomes that the converging light form the ellipsoidal reflector is preferably entered in the integrator rod, and even if the distance between the ellipsoidal reflector and the integrator rod is shortened (even if the illumination device is downsized), it becomes possible to obtain preferable light efficiency.

Further, according to the illumination device related to this aspect of the invention, since the integrator rod that converts the illumination light beam from the light source device into the light having a more uniform in-plane light intensity distribution is provided, it becomes possible to improve the uniformity of the light emitted from the light source device.

Therefore, according to the illumination device of this aspect of the invention, downsizing of the illumination device becomes possible while improving the uniformity of the light emitted from the light source device.

In the illumination device according to this aspect of the invention, it is preferable that a cylindrical lens disposed between the light source device and the integrator rod, and having a function of enlarging an incident angle of light entering the integrator rod in the second virtual plane is further provided.

By thus configuring the illumination device, since the number of times of reflection inside the integrator rod in the second virtual plane (in the cross-sectional plane in the second virtual plane) can be increased, it becomes possible to improve the uniformity of the light emitted from the integrator rod. It should be noted that since the length of the integrator rod is not required to be increased so much in the case in which the number of times of reflection in the integrator rod in the second virtual plane is increased, it becomes possible to achieve further downsizing of the illumination device.

A projector according to another aspect of the invention includes the illumination device according to one of the above aspects of the invention, an electro-optic modulation device that modulates the illumination light beam from the illumination device in accordance with image information, and a projection optical system that projects the light modulated by the electro-optic modulation device.

Therefore, since the projector according to this aspect of the invention is equipped with the illumination device which can be made lower-profile than before, the projector which is lower-profile than before can be obtained.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Hereinafter, illumination devices and projectors according to the invention will be explained based on some embodiments shown in the accompanying drawings.

First Embodiment

Figure 1A:
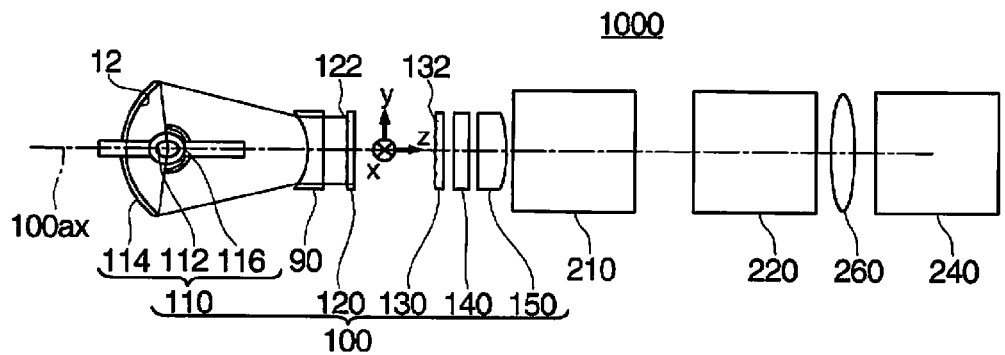
FIGS. 1A and 1B are diagrams showing a projector 1000 according to a first embodiment of the invention for the purpose of an explanation thereof.
Figure 1B:
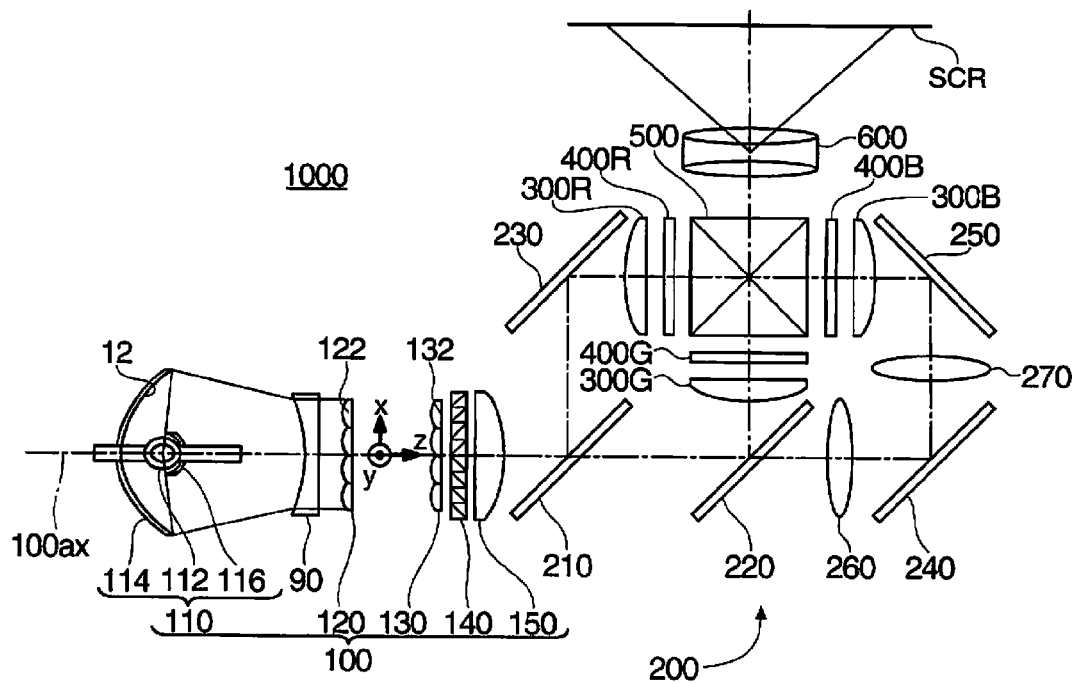

FIGS. 1A and 1B are diagrams showing a projector 1000 according to a first embodiment of the invention for the purpose of an explanation thereof. FIG. 1A is a side view showing an optical system of the projector 1000, and FIG. 1B is a top view showing the optical system of the projector 1000.

Figure 2:
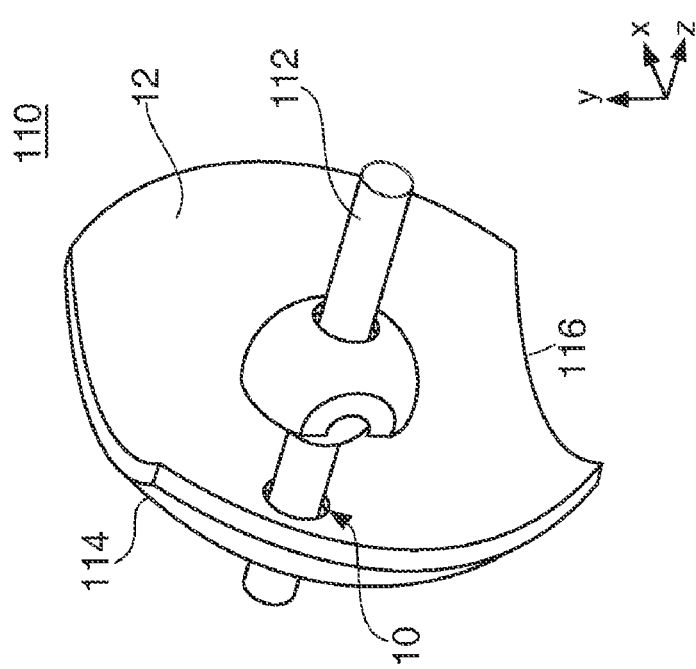
FIG. 2 is a perspective view of a light source device 110.

FIG. 2 is a perspective view of a light source device 110.

Figure 3A:
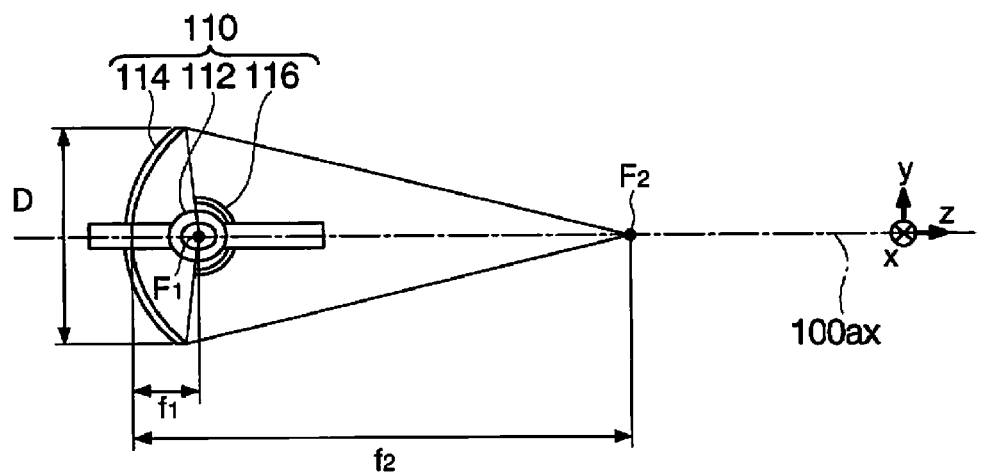
FIGS. 3A and 3B are diagrams showing an illumination device 100 according to the first embodiment of the invention for the purpose of an explanation thereof.
Figure 3B:
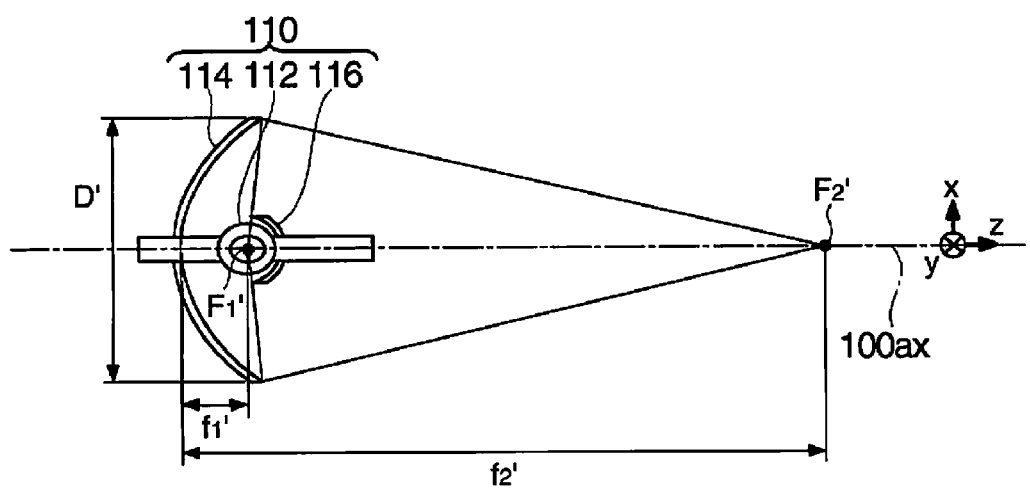

FIGS. 3A and 3B are diagrams showing an illumination device 100 according to the first embodiment of the invention for the purpose of an explanation thereof. FIG. 3A is a diagram showing the light source device 110 cut along a vertical plane (the y-z plane), and FIG. 3B is a diagram showing the light source device 110 cut along a horizontal plane (the x-z plane).

Figure 4:
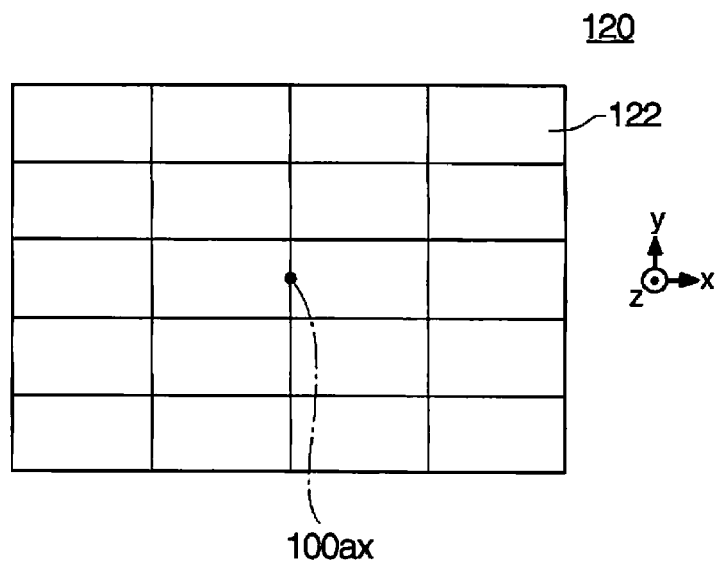
FIG. 4 is a front view of a first lens array 120.

FIG. 4 is a front view of a first lens array 120.

It should be noted that in the following explanations, three directions perpendicular to each other are defined as a z-axis direction (the illumination light axis 100ax direction in FIG. 1A), an x-axis direction (a direction perpendicular to both the sheet and the z-axis in FIG. 1A), and a y-axis direction (a direction parallel to the sheet and perpendicular to the z-axis in FIG. 1A), respectively.

As shown in FIGS. 1A and 1B, the projector 1000 according to a first embodiment of the invention is a projector provided with an illumination device 100, a color separation/light guiding optical system 200 for separating the illumination beam from the illumination device 100 into three colored light beams of a red light beam, a green light beam, and a blue light beam and guiding them to an area to be illuminated, three liquid crystal light modulation devices 400R, 400G, and 400B as electro-optic modulation devices for respectively modulating the three colored light beams, which are separated into by the color separation/light guiding system 200, in accordance with image information, a cross dichroic prism 500 for combining the colored light beams thus modulated by the three liquid crystal light modulation devices 400R, 400G, and 400B, and a projection optical system 600 that projects the light beam thus combined by the cross dichroic prism 500 onto a projection surface such as a screen SCR.

The illumination device 100 has a light source device 110 that emits the illumination beam towards the area to be illuminated, a concave lens 90, a first lens array 120 having a plurality of first small lenses 122 for dividing the lighting beam emitted from the concave lens 90 into a plurality of partial beams, a second lens array 130 having a plurality of second small lenses 132 corresponding respectively to the plurality of first small lenses 122 of the first lens array 120, a polarization conversion element 140 that converts each of the partial beams from the second lens array 130 into a substantially unique linearly-polarized light beam having a uniform polarization direction and then emitting the resulted light beams, and an overlapping lens 150 for overlapping the partial beams emitted from the polarization conversion element 140 with each other in the area to be illuminated.

As shown in FIGS. 1A, 1B, 2, 3A, and 3B, the light source device 110 has an ellipsoidal reflector 114, a light emitting tube 112 having the emission center in the vicinity of the first focal position of the ellipsoidal reflector 114, and a secondary mirror 116 that reflects the light, which is emitted from the light emitting tube 112 towards the area to be illuminated, towards the light emitting tube 112. The light source device 110 emits the light beam having the illumination beam axis 100ax as the center axis.

The light emitting tube 112 is provided with a lamp section and a pair of sealing sections extending on both sides of the lamp section. The lamp section is made of quartz glass and formed to have a spherical shape, and is provided with a pair of electrodes disposed inside the lamp section, and mercury, a rare gas, and a small amount of halogen encapsulated inside the lamp section. As the light emitting tube 112, various light emitting tubes can be adopted, and specifically, a metal halide lamp, a high-pressure mercury lamp, a super high-pressure mercury lamp, and so on can be adopted.

The ellipsoidal reflector 114 has an opening section 10 in which one of the sealing sections of the light emitting tube 112 is inserted and fixed thereto, and a reflecting concave surface 12 that reflects the light, which is emitted from the light emitting tube 112, towards the second focal position.

Further, defining the first focal position (the first focal position of the ellipsoidal reflector 114 in a vertical cross-sectional plane) and the second focal position of the ellipsoidal reflector 114 in the vertical plane (a first virtual plane), which includes the center axis of the ellipsoidal reflector 114 and forms the vertical cross-sectional plane of the ellipsoidal reflector, as $F_1$ and $F_2$, respectively, as shown in FIG. 3A, and defining the first focal position (the first focal position of the ellipsoidal reflector 114 in a horizontal cross-sectional plane) and the second focal position of the ellipsoidal reflector 114 in the horizontal plane (a second virtual plane), which includes the center axis of the ellipsoidal reflector 114 and forms the horizontal cross-sectional plane of the ellipsoidal reflector, as $F_1'$ and $F_2'$, respectively, as shown in FIG. 3B, the ellipsoidal reflector 114 has a rotationally asymmetrical concave shape having $F_1$ and $F_1'$ at the same position, and $F_2$ at a position between $F_2'$ and the ellipsoidal reflector 114. In other words, the ellipsoidal reflector 114 has a concave shape having the first focal distance $f_1$ in the vertical cross-sectional plane and the first focal distance $f_1'$ in the horizontal cross-sectional plane identical to each other, and the second focal distance $f_2$ in the vertical cross-sectional plane shorter than the second focal distance $f_2'$ in the horizontal cross-sectional plane.

Further, defining the diameter size of the ellipsoidal reflector 114 in the vertical cross-sectional plane as D, and the diameter size of the ellipsoidal reflector 114 in the horizontal cross-sectional plane as D', the ellipsoidal reflector 114 has a shape obtained by removing parts of the reflecting concave surface 12 so that D<D' is satisfied.

The secondary mirror 116 is a reflecting section covering roughly a half of the lamp section of the light emitting tube 112, and disposed so as to be opposed to the reflecting concave surface 12 of the ellipsoidal reflector 114. The other of the sealing sections of the light emitting tube 112 is inserted in and fixed to the secondary mirror 116. The secondary mirror 116 returns the light, which is emitted from the light emitting tube 112 and proceeding in other directions than the directions towards the ellipsoidal reflector 114, to the light emitting tube 112 so that the light enters the ellipsoidal reflector 114. The secondary mirror 116 is configured so as to reflect the light, which is emitted from the light emitting tube 112 towards the removed parts of the reflecting concave surface 12 of the ellipsoidal reflector 114, towards the light emitting tube 112.

The concave lens 90 is disposed between the ellipsoidal reflector 114 and the area to be illuminated, and configured so as to emit light from the ellipsoidal reflector 114 towards the first lens array 120. The concave lens 90 has an entrance surface shaped as an a spherical lens surface, and an exit surface shaped as a plane.

Defining the refractive power of the lens in the vertical cross-sectional plane as $\rho$, and the refractive power of the lens in the horizontal cross-sectional plane as $\rho'$, the lens surface of the concave lens 90 has the shape satisfying $\rho > \rho'$. Defining the a spherical coefficient of the lens surface of the concave lens 90 in the vertical cross-sectional plane as K, and the a spherical coefficient of the lens surface of the concave lens 90 in the horizontal cross-sectional plane as K', the lens surface of the concave lens 90 is configured to satisfy $K < -1$, $K' < -1$, and $K' \leqq K$.

The first lens array 120 has a function of a beam splitting optical element for splitting the light beam from the concave lens 90 into partial light beams, and has a configuration of arranging the plurality of first small lenses 122 in a plane perpendicular to the illumination light axis 100$ax$ in a matrix with five rows and four columns (see FIG. 4). Each of the first small lenses 122 has an outer shape, which is a similar figure to the outer shape of the image forming area of the liquid crystal panel described later, and has an aspect ratio of (vertical size):(horizontal size)=9:16. Since the plurality of first small lenses 122 is arranged in five rows and four columns, and the outer shape of each of the first small lenses 122 has the aspect ratio of (vertical size):(horizontal size)=9:16, the outer shape of the first lens array 120 becomes a relatively flat shape with the aspect ratio of (vertical size):(horizontal size)=45:64.

The second lens array 130 has a function of imaging the image of each of the first small lenses 122 of the first lens array 120 in the vicinity of the image forming areas of the liquid crystal panels in cooperation with the overlapping lens 150. The second lens array 130 has substantially the same configuration as the first lens array 120, namely the configuration of arranging the plurality of second small lenses 132 in a plane perpendicular to the illumination light axis 100$ax$ in a matrix with two or more rows and two or more columns.

The polarization conversion element 140 is a polarization conversion element that converts the each of the partial beams split into by the first lens array 120 into a substantially unique linearly-polarized light beam having a uniform polarization direction, and emitting the resulted partial light beams.

The polarization conversion element 140 is provided with a polarization splitting layer for transmitting a part of the illumination light beam from the light source device 110 having one polarization component (e.g., P-polarization component) and reflecting the other part of the light beam having the other polarization component (e.g., S-polarization component) in a direction perpendicular to the illumination light axis 100$ax$, a reflecting layer that reflects the light beam having the other polarization component reflected by the polarization splitting layer in the direction parallel to the illumination light axis 100$ax$, and a retardation plate that converts the light beam having the one polarization component transmitted through the polarization splitting layer into a light beam having the other polarization component.

The overlapping lens 150 is an optical element for collecting the plurality of partial light beams passing through the first lens array 120, the second lens array 130, and the polarization conversion element 140 to overlap them in the vicinity of the image forming areas of the liquid crystal panel. The overlapping lens 150 is disposed so that the optical axis of the overlapping lens 150 and the illumination light axis 100$ax$ of the illumination device 100 become substantially identical to each other. It should be noted that the overlapping lens 150 can be configured with a compound lens having a plurality of lenses combined with each other.

The color separation/light guiding optical system 200 includes dichroic mirrors 210, 220, reflecting mirrors 230, 240, 250, an entrance side lens 260, and a relay lens 270. The color separation/light guiding optical system 200 has a function of separating the illumination light beam emitted from the overlapping lens 150 into three colored light beams, namely the red light beam, the green light beam, and the blue light beam, and respectively guiding the colored light beams to the three liquid crystal light modulation devices 400R, 400G, 400B to be objects of illumination.

The dichroic mirrors 210, 220 are optical elements each having a wavelength selecting film formed on a substrate, which reflects a light beam in a predetermined wavelength band and transmits a light beam in another wavelength band. The dichroic mirror 210 disposed in an anterior stage of the light path is a mirror that reflects the red light component and transmitting the other colored light components. The dichroic mirror 220 disposed in a posterior stage of the light path is a mirror that reflects the green light component and transmitting the blue light component.

The red light component reflected by the dichroic mirror 210 is deflected by the reflecting mirror 230, and enters the liquid crystal light modulation device 400R for the red light beam via a condenser lens 300R. The condenser lens 300R is provided for converting each of the partial light beams from the overlapping lens 150 into a light beam substantially parallel with respect to each of the principal rays. It should be noted that other condenser lenses 300G, 300B are configured similarly to the condenser lens 300R.

The green light component out of the green light component and the blue light component transmitted through the dichroic mirror 210 is reflected by the dichroic mirror 220, and enters the liquid crystal light modulation device 400G for green light beam via the condenser lens 300G. On the other hand, the blue light component is transmitted through the dichroic mirror 220, and enters the liquid crystal light modulation device 400B via the entrance side lens 260, an entrance side reflecting mirror 240, the relay lens 270, an exit side reflecting mirror 250, and the condenser lens 300B. The entrance side lens 260, the relay lens 270, and the reflecting mirrors 240, 250 have a function of guiding the blue light component thus transmitted through the dichroic mirror 220 to the liquid crystal light modulation device 400B.

The liquid crystal light modulation devices 400R, 400G, and 400B are for modulating the respective illumination light beams in accordance with the image information, and form an object to be illuminated by the illumination device 100. The liquid crystal light modulation devices 400R, 400G, and 400B each have the liquid crystal panel, an entrance side polarization plate disposed on the light beam entrance side of the liquid crystal panel, and an exit side polarization plate disposed on the light beam exit side of the liquid crystal panel although an explanation with reference to a drawing is omitted here.

The liquid crystal panel has the liquid crystal material as an electro-optic medium airtightly encapsulated between a pair of transparent glass substrates (a TFT substrate and an opposed substrate), and is a TN-type liquid crystal panel. For example, polysilicon TFTs are used as switching elements, the polarization direction of the unique linearly-polarized light beam emitted from each of the entrance side polarization plates is modulated in accordance with the image information thus provided. As the liquid crystal panels, there are used those for wide vision with the aspect ratio of the image forming area of 9:16.

The entrance side polarization plate, the liquid crystal panel, and the exit side polarization plate perform the light modulation of the respective colored light beams input therein.

The cross dichroic prism 500 is an optical element for combining optical images modulated for respective colored light beams emitted from the respective exit side polarization plates to form a color image. The cross dichroic prism 500 has a substantially rectangular planar shape formed of four rectangular prisms bonded with each other, and on the substantially X-shaped interfaces on which the rectangular prisms are bonded with each other, there are formed dielectric multilayer films. The dielectric multilayer film formed on one of the substantially X-shaped interfaces is that reflects the blue light beam, and the dielectric multilayer film formed on the other of the interfaces is that reflects the red light beam. The blue light beam and the red light beam are deflected by these dielectric multilayer films to have the proceeding direction aligned with the proceeding direction of the green light, thus the three colored light beams are combined.

The color image emitted from the cross dichroic prism 500 is enlargedly projected by the projection optical system 600 to form a large screen image on the screen SCR.

Hereinafter, the illumination device 100 according to the first embodiment will be explained in further detail.

Figure 5:
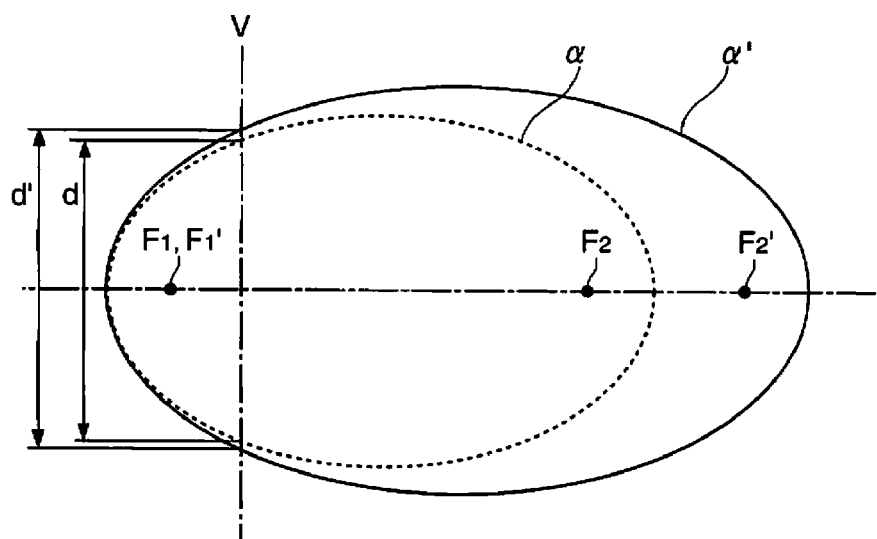
FIG. 5 is a diagram showing a concave shape of an ellipsoidal reflector 114 for the purpose of an explanation thereof.

FIG. 5 is a diagram showing the concave shape of the ellipsoidal reflector 114 for the purpose of an explanation thereof. In FIG. 5, the ellipse a illustrated with a broken line is drawn virtually based on the concave shape of the ellipsoidal reflector 114 in the vertical cross-sectional plane, and the ellipse α' illustrated with a solid line is drawn based on the convex shape of the ellipsoidal reflector 114 in the horizontal cross-sectional plane.

In the case with the ellipsoidal reflector provided with a convex shape having the first focal position $F_1$ in the vertical cross-sectional plane and the first focal position $F_1'$ in the horizontal cross-sectional plane at the same position, and the second focal position $F_2$ in the vertical cross-sectional plane located between the second focal position $F_2'$ in the horizontal cross-sectional plane and the first focal position, as is understood from FIG. 5, the size of the ellipse a becomes smaller than the size of the ellipse α'. In this case, when comparing the diameter size of the edge of the opening of the ellipsoidal reflector assuming that the straight line V is located at the position of the edge of the opening of the ellipsoidal reflector, as is understood from FIG. 5, the vertical diameter size d of the edge of the opening of the ellipsoidal reflector becomes smaller than the horizontal diameter size d' of the edge of the opening of the ellipsoidal reflector.

As described above, according to the illumination device 100 related to the first embodiment of the invention, since the vertical diameter size becomes smaller than the horizontal diameter size in the ellipsoidal reflector 114, the vertical size can be made smaller than the horizontal size in the light source device 110. As a result, it becomes possible to make the thickness of the illumination device 100 smaller (make the height of the illumination device 100 smaller) than before.

Figure 6A:
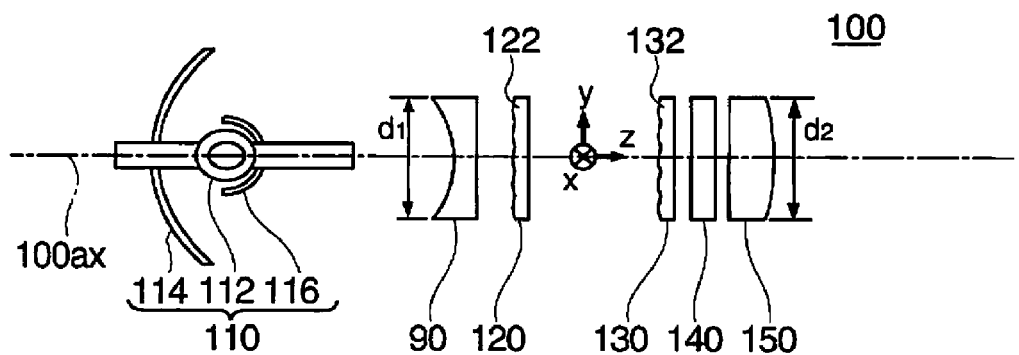
FIGS. 6A and 6B are diagrams showing the illumination device 100 according to the first embodiment of the invention for the purpose of an explanation thereof.
Figure 6B:
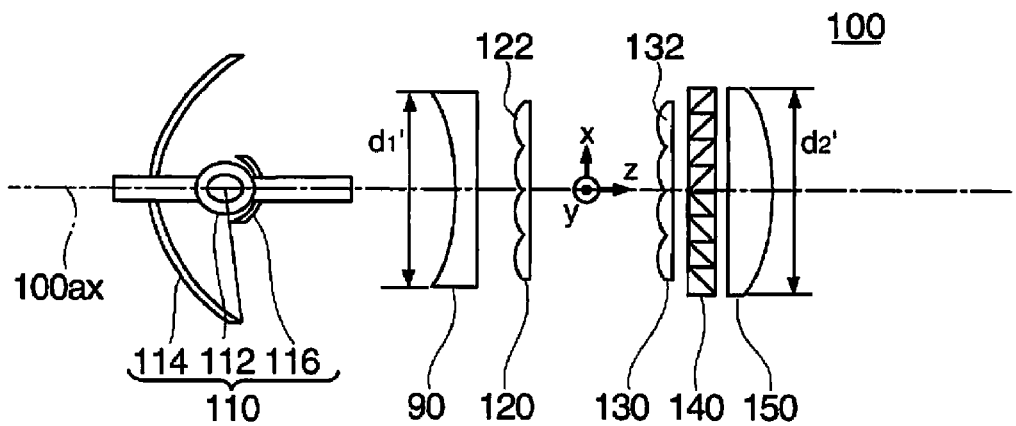

FIGS. 6A and 6B are diagrams showing the illumination device 100 according to the first embodiment of the invention for the purpose of an explanation thereof. FIG. 6A is a side view of the illumination device 100, and FIG. 6B is a top view of the illumination device 100.

Figure 7A:
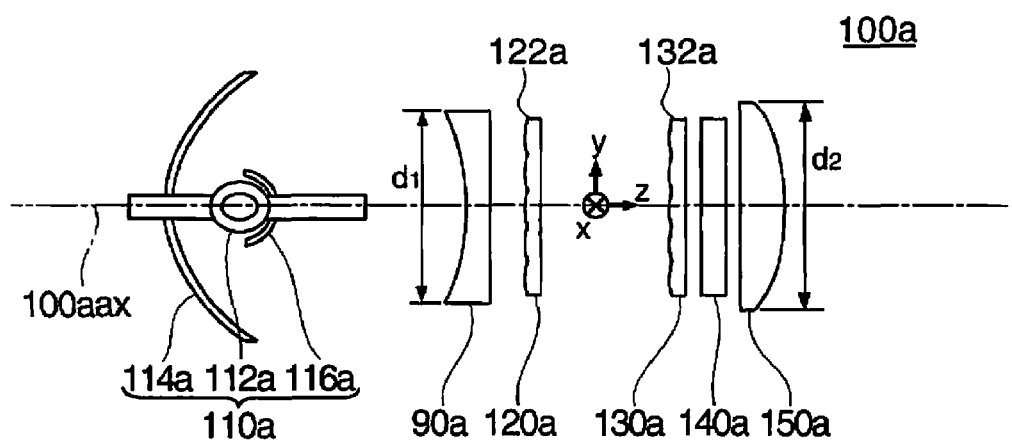
FIGS. 7A and 7B are diagrams showing an illumination device 100a according to a comparative example of the first embodiment of the invention for the purpose of an explanation thereof.
Figure 7B:
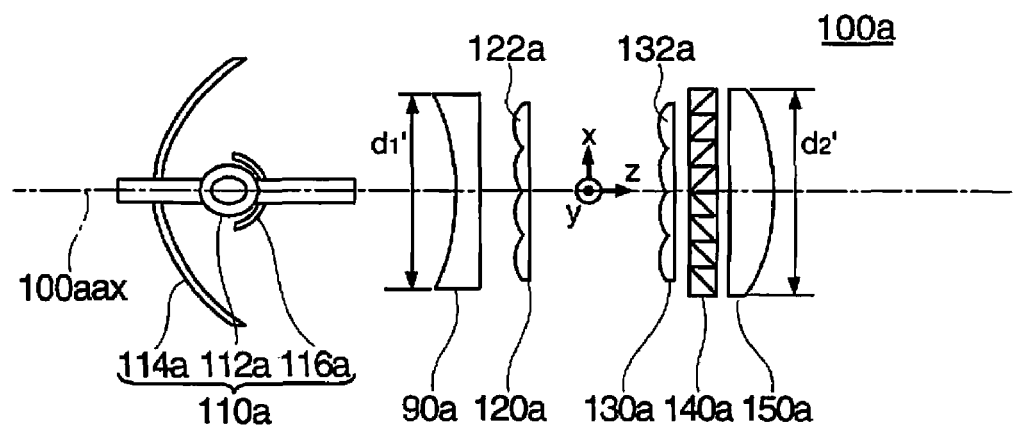

FIGS. 7A and 7B are diagrams showing an illumination device 100a according to a comparative example of the first embodiment of the invention for the purpose of an explanation thereof. FIG. 7A is a side view of the illumination device 100a, and FIG. 7B is a top view of the illumination device 100a.

The illumination device 100a according to the comparative example of the first embodiment basically has a configuration similar to the illumination device 100 according to the first embodiment, but is different from the illumination device 100 according to the first embodiment in that it is provided with an ellipsoidal reflector having $F_1$ and $F_1'$ at the same position and $F_2$ and $F_2'$ at the same position, in other words, a rotationally symmetric ellipsoidal reflector, as the ellipsoidal reflector.

Therefore, according to the illumination device 100a related to the comparative example, as shown in FIGS. 7A and 7B, the vertical (in the y-axis direction) size $d_1$ of the concave lens 90a becomes the same as the horizontal (in the x-axis direction) size $d_1'$ of the concave lens 90a. In other words, according to the illumination device 100a related to the comparative example 100a, it is not achievable to reduce the vertical size $d_1$ of the concave lens 90a. Further, since it is not achievable to reduce the vertical size $d_1$ of the concave lens 90a, it is also not achievable to reduce the maximum vertical size $d_2$ of the optical system (i.e., the first lens array 120a, the second lens array 130a, the polarization conversion element 140a, and the overlapping lens 150a) disposed on the posterior stage of the concave lens 90a. As a result, it is not achievable to reduce the thickness of the illumination device 100a.

In contrast, according to the illumination device 100 related to the first embodiment, since $F_2$ is located between $F_2'$ and the ellipsoidal reflector, as shown in FIGS. 6A and 6B, the vertical size $d_1$ of the concave lens 90 can be made smaller than the horizontal size $d_1'$ of the concave lens 90. Further, regarding also the optical system (the first lens array 120, the second lens array 130, the polarization conversion element 140, and the overlapping lens 150) disposed on the posterior stage of the concave lens 90, the vertical size $d_2$ can be made smaller than the horizontal size $d_2'$. As a result, it becomes possible to make the thickness of the illumination device 100 smaller (make the height of the illumination device 100 smaller) than before.

In the illumination device 100 according to the first embodiment, as shown in FIGS. 3A and 3B, defining the diameter size of the ellipsoidal reflector 114 in the vertical cross-sectional plane as D, and the diameter size of the ellipsoidal reflector 114 in the horizontal cross-sectional plane as D', the ellipsoidal reflector 114 has a shape obtained by removing parts of the reflecting concave surface so that D<D' is satisfied. Thus, since the vertical size of the light source device 110 becomes further smaller than the horizontal size of the light source device 110, it becomes possible to make the thickness of the illumination device 100 further smaller (make the height of the illumination device 100 further smaller) than before.

In the illumination device 100 according to the first embodiment, since the light source device 110 is further provided with the secondary mirror 116, the light emitted from the light emitting tube 112 towards the area to be illuminated is reflected towards the ellipsoidal reflector 114. Therefore, downsizing of the ellipsoidal reflector 114 can be achieved without requiring the size of the ellipsoidal reflector 114 to be set so large as to cover the end of the light emitting tube 112 on the illuminated area side thereof, as a result, low-profiling of the illumination device 100 can be achieved.

Further, since downsizing of the ellipsoidal reflector 114 can be achieved, the focusing angle and the spot size of the beam focused from the ellipsoidal reflector 114 towards the second focal point of the ellipsoidal reflector 114 can be made smaller, thus the size of the optical system (the first lens array 120, the second lens array 130, the polarization conversion element 140, and the overlapping lens 150) disposed on the posterior stage of the light source device 110 can be made further smaller, and thereby achieving further low-profiling of the illumination device 100.

Further, in the illumination device 100 according to the first embodiment, since the secondary mirror 116 is configured to reflect the light, which is emitted from the light emitting tube 112 towards the removed part of the reflecting concave surface 12 of the ellipsoidal reflector 114, towards the light emitting tube 112, even in the case in which the part of the reflecting concave surface 12 of the ellipsoidal reflector 114 is removed in order for achieving low-profiling of the illumination device 100, it becomes possible to preventing the degradation of the light efficiency caused by the removal.

Incidentally, focusing attention on the angle formed between the center axis of the incident light beam to the concave lens 90 and the illumination light axis 100*ax*, according to the illumination device 100 relating to the first embodiment, since $F_2$ is located between $F_2'$ and the ellipsoidal reflector, the angle (the incident angle to the concave lens 90 in the vertical cross-sectional plane) formed between the center axis of the incident light beam to the concave lens 90 and the illumination light axis 100*ax* in the vertical cross-sectional plane becomes larger than the angle (the incident angle to the concave lens 90 in the horizontal cross-sectional plane) formed between the center axis of the incident light beam to the concave lens 90 and the illumination light axis 100*ax* in the horizontal cross-sectional plane although not shown in the drawings. On this occasion, since the concave lens 90 is arranged to have the stronger refractive power in the concave lens of the vertical cross-sectional plane than the refractive power in the concave lens of the horizontal cross-sectional plane, the light (the light entering the concave lens 90 in the vertical cross-sectional plane) with a relatively large angle is refracted with the stronger refractive power while the light (the light entering the concave lens 90 in the horizontal cross-sectional plane) with a relatively small angle is refracted with the weak refractive power, thus it becomes possible to substantially collimate the illumination light beam from the light source device 110 effectively.

In the illumination device 100 according to the first embodiment, as described above, there is provided the first lens array 120, the second lens array 130, the polarization conversion element 140, and the overlapping lens 150. Further, since the lengths of the first lens array 120, the second lens array 130, the polarization conversion element 140, and the overlapping lens 150 in the vertical direction (the y-axis direction) are substantially the same as shown in FIG. 6A, it becomes possible to make the thickness of the illumination device 100 relatively small while improving the uniformity of the light emitted from the light source device 110.

Figure 8A:
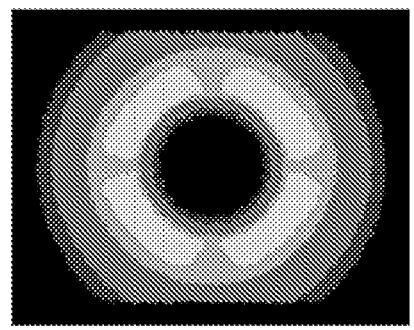
FIGS. 8A through 8D are diagrams showing an in-plane light intensity distribution in the illumination device 100.
Figure 8B:
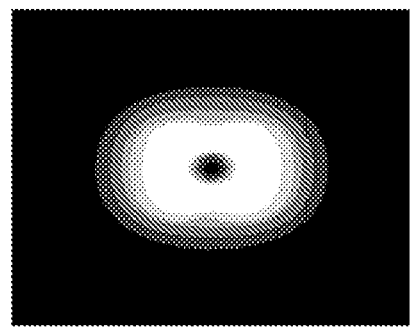
Figure 8C:
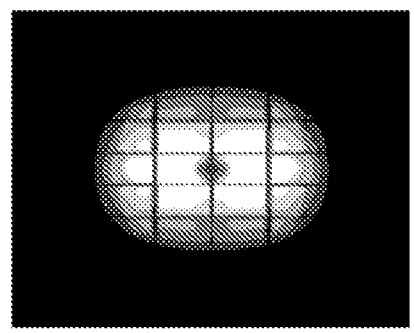
Figure 8D:
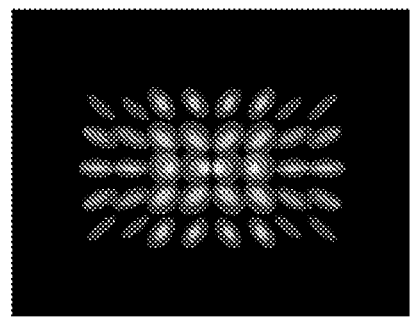

FIGS. 8A through 8D are diagrams showing an in-plane light intensity distribution in the illumination device 100. FIG. 8A is a diagram showing the in-plane light intensity distribution of the light emitted from the ellipsoidal reflector 114, FIG. 8B is a diagram showing the in-plane light intensity distribution of the light emitted from the concave lens 90, FIG. 8C is a diagram showing the in-plane light intensity distribution of the light emitted from the first lens array 120, and FIG. 8D is a diagram showing the in-plane light intensity distribution of the light emitted from the polarization conversion element 140.

In the illumination device 100 according to the first embodiment, since the ellipsoidal reflector 114 formed of the configuration described above is provided, the illumination light beam emitted from the light source device 110 (the concave lens 90) becomes flat as shown in FIG. 8B. In this case, since the outer shape of the first lens array 120 is relatively flat ((vertical size):(horizontal size)=45:64, see FIG. 4), as in understood from FIG. 8C, it becomes possible to efficiently use the flat illumination light beam emitted from the light source device 110 (the concave lens 90).

Since the projector 1000 according to the first embodiment is equipped with the illumination device 100, which can be made lower-profile than before as described above, the projector 1000 can be formed as a lower profiled projector than before.

Second Embodiment

Figure 9A:
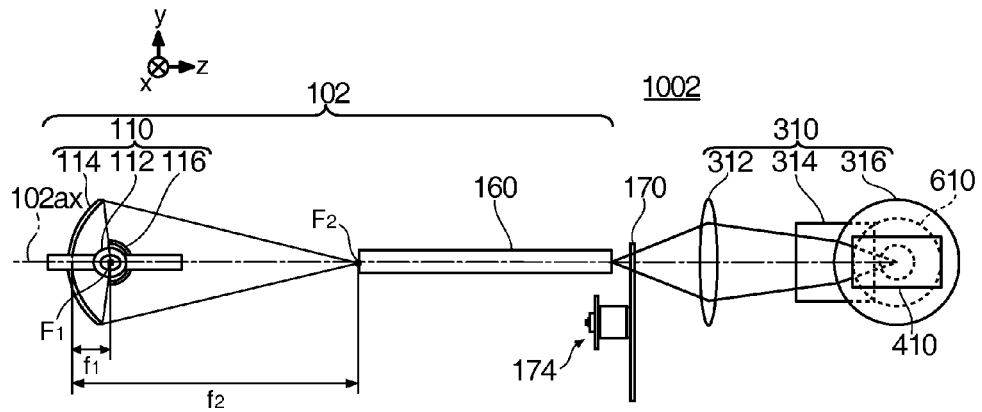
FIGS. 9A through 9C are diagrams showing an illumination device 102 and a projector 1002 according to a second embodiment of the invention for the purpose of an explanation thereof.
Figure 9B:
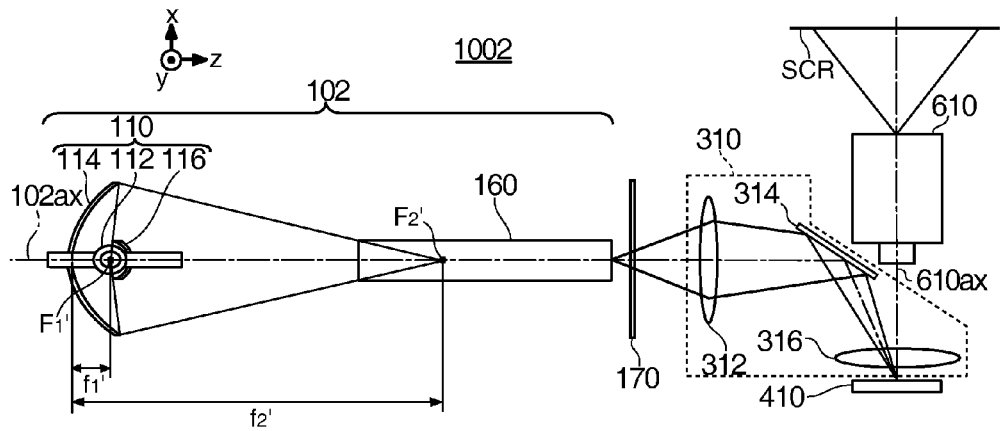
Figure 9C:
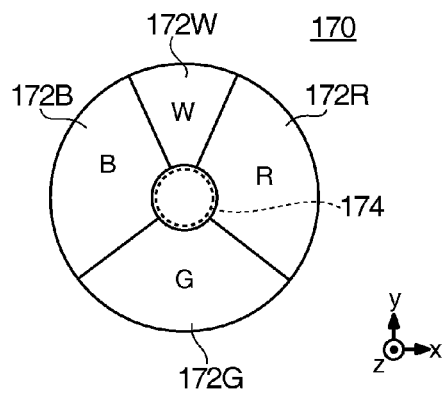

FIGS. 9A through 9C are diagrams showing an illumination device 102 and a projector 1002 according to a second embodiment of the invention for the purpose of an explanation thereof. FIG. 9A is a side view showing an optical system of the projector 1002, FIG. 9B is a top view showing the optical system of the projector 1002, and FIG. 9C is a diagram showing a color wheel 170 for the purpose of an explanation thereof.

It should be noted that in FIGS. 9A through 9C, the same members as shown in FIGS. 1A and 1B are denoted with the same reference numerals and detailed explanations therefor will be omitted.

As shown in FIGS. 9A through 9C, the projector 1002 according to the second embodiment is a projector provided with an illumination device 102, a color wheel 170 disposed on the light exit side of the illumination device 102, a relay optical system 310 for guiding the light transmitted through the color wheel 170 to the area to be illuminated, a micromirror light modulation device 410 as an electro-optic modulation device that modulates the light from the relay optical system 310 in accordance with the image information, and a projection optical system 610 that projects the light modulated by the micromirror light modulation device 410 on the projection surface such as the screen SCR.

The illumination device 102 is provided with the light source device 110 that emits the illumination light beam towards the area to be illuminated, and an integrator rod 160 that converts the illumination light beam from the light source device 110 into the light with a more uniform in-plane light intensity distribution. It should be noted that since the light source device 110 is the same as what is explained in the first embodiment section, the detailed explanation therefor will be omitted here.

The integrator rod 160 is an optical member having a function of causing the light from the light source device 110 multiple reflection on the inside surfaces, thereby converting the light from the light source device 110 into the light with a more uniform intensity distribution. The integrator rod 160 has a tapered shape, which becomes thinner towards the posterior stage of the light path. As the integrator rod 160, a solid-core glass rod, for example, can preferably be used.

The light entrance surface of the integrator rod 160 is configured so that the size in the vertical direction (the y-axis direction) is larger than the size in the horizontal direction (the x-axis direction). It should be noted that in the illumination device 102 according to the second embodiment, the integrator rod 160 is disposed so that the light entrance surface of the integrator rod 160 is located at the second focal position $F_2$ of the ellipsoidal reflector 114 in the vertical cross-sectional plane.

The shape of the light exit surface of the integrator rod 160 is arranged to be a substantially similar figure with the shape of the image forming area of the micromirror light modulation device 410 although the explanation with reference to a drawings will be omitted here. It should be noted that since the illumination light axis 102*ax* is disposed tilted to the center axis of the micromirror light modulation device 410, the light emitted to the micromirror light modulation device 410 has a contour shape distorted in accordance with the tilt. Therefore, as the shape of the light exit surface of the integrator rod 160 in the case as described above, the shape of correcting the distortion of the contour of the light emitted to the micromirror light modulation device 410 is more preferably be adopted.

As shown in FIG. 9C, the color wheel 170 is a disc-like member provided with three transmissive color filters 172R, 172G, and 172B formed respectively in three areas out of the four fan-like areas partitioned along the rotational direction. At the center section of the color wheel 170, there is disposed a motor 174 for rotating the color wheel 170.

The color filter 172R transmits the light in the red wavelength band, and reflects or absorbs the light in the other wavelength bands out of the illumination light beam from the integrator rod 160, thereby transmitting only the red light component. Similarly, the color filters 172G, 172B transmit the light in the green and blue wavelength bands and reflect or absorb the light with the other wavelength bands out of the illumination light beam from the integrator rod 160, thereby transmitting only the green and blue light components, respectively. As the color filters 172R, 172G, and 172B, for example, dielectric multilayer films or filter plates formed using coating materials can preferably be used. In the four fan-like areas, the remaining area other than the areas with the color filters 172R, 172G, and 172B is formed as a transparent area 172W so that the light from the integrator rod 160 can directly be transmitted. According to the transparent area 172W, the luminance of the projected image can be increased, thereby ensuring the brightness of the projected image.

It should be noted that the color wheel 170 can be omitted, and in such a case, the projection image is a monochrome image.

The illumination light beam emitted from the integrator rod 160 becomes a illumination light beam including the three colored light components of the red light component, the green light component, and the blue light component after transmitted through the color wheel 170 as described above, and the illumination light beam is enlarged by the relay optical system 310, and emitted on the image forming area of the micromirror light modulation device 410. As shown in FIGS. 9A and 9B, the relay optical system 310 has a relay lens 312, a reflecting mirror 314, and a condenser lens 316, and provided with a function of guiding the illumination light beam from the integrator rod 160 (the color wheel 170) to the image forming area of the micromirror light modulation device 410.

The relay lens 312 has a function of imaging the illumination light beam from the integrator rod 160 in the vicinity of the image forming area of the micromirror light modulation device 410 without diffusing the illumination light beam in cooperation with the condenser lens 316. It should be noted that the relay lens 312 can be formed of a single lens, or a compound lens composed of a plurality of lenses combined with each other.

The reflecting mirror 314 is disposed tilted with respect to the illumination light axis 102ax, and deflects the illumination light beam from the relay lens 312 and guides the illumination light beam to the micromirror light modulation device 410. Thus, the projector 1002 can be made compact.

The condenser lens 316 overlaps the illumination light beam from the relay lens 312 and the reflecting mirror 314 substantially on the image forming area of the micromirror light modulation device 410, and enlargedly projecting the light modulated by the micromirror modulation device 410 in cooperation with the projection optical system 610.

The micromirror light modulation device 410 is a reflection direction controlling light modulation device having a function of reflecting the light from the relay optical system 310 with the micromirrors corresponding respectively to the pixels in accordance with the image information, thereby emitting the image light representing the image towards the projection optical system 610. As the micromirror light modulation device 410, for example, a digital micromirror device (DMD, a trademark of Texas Instruments) can be used.

The image light emitted from the micromirror light modulation device 410 is enlargedly projected by the projection optical system 610 to form a large screen image on the screen SCR.

The micromirror light modulation device 410 and the projection optical system 610 are disposed so that the respective center axes are identical to each other. It should be noted that in the case in which the projector 1002 according to the second embodiment is made as a projector with a configuration of a tilted projection, it is preferable to adopt the configuration in which the projection light axis 610ax of the projection optical system 610 is shifted in the tilt direction from the center axis of the micromirror light modulation device 410.

According to the illumination device 102 related to the second embodiment configured as described above, since the ellipsoidal reflector 114 explained in the first embodiment is provided, it becomes possible to make the vertical size smaller than the horizontal size in the light source device 110, and as a result, it becomes possible to make the thickness of the illumination device 102 smaller (the height of the illumination device 102 smaller) than before.

Therefore, the illumination device 102 according to the second embodiment becomes the illumination device which can be made to be lower profile than before similarly to the illumination device 100 according to the first embodiment.

Further, according to the illumination device 102 related to the second embodiment, since $F_2$ is located between $F_2'$ and the ellipsoidal reflector, it becomes possible to make the position of the light entrance surface of the integrator rod 160 nearer to the ellipsoidal reflector. In other words, since the distance between the ellipsoidal reflector 114 and the integrator rod 160 can be shortened, the illumination device 102 can be made smaller than before.

Incidentally, focusing attention to the spot size of the converging light from the ellipsoidal reflector 114, since $F_2$ is located between $F_2'$ and the ellipsoidal reflector, the spot size (see FIG. 9B) of the converging light from the ellipsoidal reflector 114 in the horizontal cross-sectional plane becomes larger than the spot size (see FIG. 9A) of the converging light from the ellipsoidal reflector 114 in the vertical cross-sectional plane.

With respect to the ellipsoidal reflector 114 from which the converging light is emitted, according to the illumination device 102 related to the second embodiment, since the integrator rod 160 having the light entrance surface with the horizontal size larger than the vertical size is provided, it becomes that the converging light form the ellipsoidal reflector 114 is preferably entered in the integrator rod 160, and even if the distance between the ellipsoidal reflector 114 and the integrator rod 160 is shortened (even if the illumination device 102 is downsized), it becomes possible to obtain preferable light efficiency.

Further, according to the illumination device 102 related to the second embodiment, since the integrator rod 160 that converts the illumination light beam from the light source device 110 into the light having a more uniform in-plane light intensity distribution is provided, it becomes possible to improve the uniformity of the light emitted from the light source device 110.

Therefore, according to the illumination device 102 related to the second embodiment, it becomes possible to downsize the illumination device 102 while improving the uniformity of the light emitted from the light source device 110.

Since the projector 1002 according to the second embodiment is equipped with the illumination device 102, which can be made lower-profile than before as described above, the projector 1002 can be formed as a lower profiled projector than before.

Third Embodiment

Figure 10A:
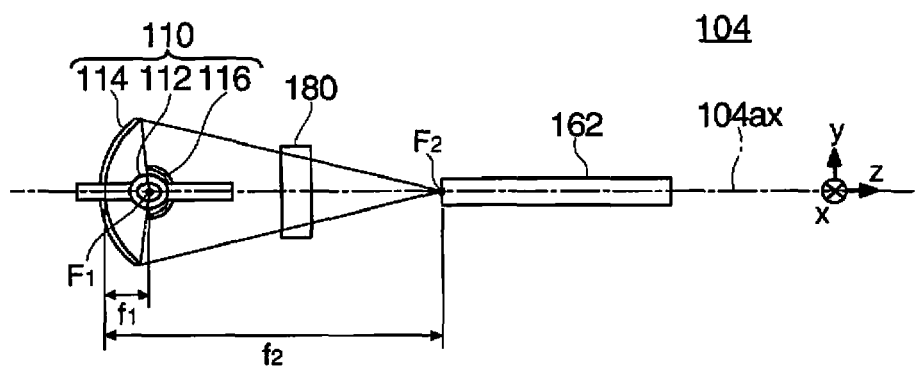
FIGS. 10A and 10B are diagrams showing an illumination device 104 according to a third embodiment of the invention for the purpose of an explanation thereof.
Figure 10B:
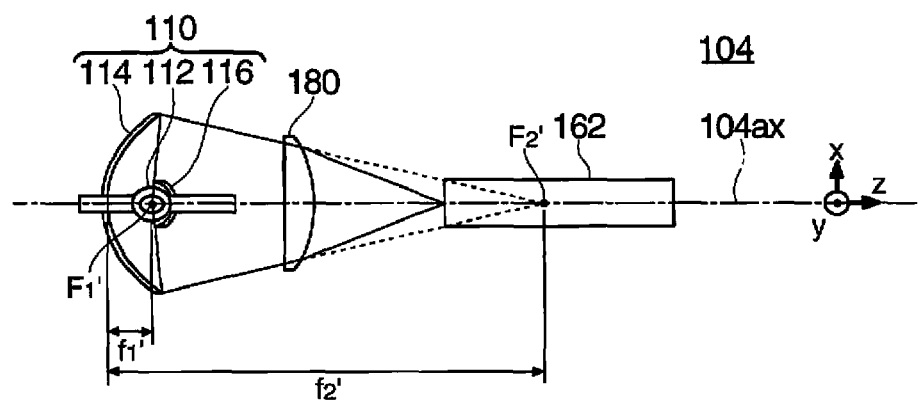

FIGS. 10A and 10B are diagrams showing the illumination device 104 according to a third embodiment of the invention for the purpose of an explanation thereof. FIG. 10A is a side view showing an optical system of the illumination device 104, and FIG. 10B is a top view showing the optical system of the illumination device 104.

It should be noted that in FIGS. 10A and 10B, the same members as shown in FIGS. 9A and 9B are denoted with the same reference numerals and detailed explanations therefor will be omitted.

The illumination device 104 according to the third embodiment of the invention basically has a configuration similar to the illumination device 102 according to the second embodiment, but is different from the illumination device 102 according to the second embodiment in being further provided with a cylindrical lens.

As shown in FIGS. 10A and 10B, the cylindrical lens 180 is disposed between the light source device 110 and the integrator rod 162, and has a function of enlarging the incident angle of the light entering the integrator rod 162 in the horizontal cross-sectional plane.

As described above, although the illumination device 104 according to the third embodiment is different from the illumination device 102 according to the second embodiment in being further provided with the cylindrical lens, since the illumination device 104 is provided with the ellipsoidal reflector 114 explained in the first embodiment section similarly to the case with the illumination device 102 according to the second embodiment 102, it becomes possible to make the vertical size shorter than the horizontal size in the light source device 110, and as a result, it becomes possible to make the thickness of the illumination device 104 smaller (the height of the illumination device 104 smaller) than before.

Therefore, the illumination device 104 according to the third embodiment becomes the illumination device, which can be made to be lower profile than before similarly to the illumination devices 100, 102 according to the first and second embodiments.

In the illumination device 104 according to the third embodiment, since the cylindrical lens 180 described above is further provided, the number of times of reflection in the integrator rod 162 in the horizontal cross-sectional plane can be increased, thus it becomes possible to improve the uniformity of the light emitted from the integrator rod 162. It should be noted that since the length of the integrator rod 162 is not required to be increased so much in the case in which the number of times of reflection in the integrator rod 162 in the horizontal cross-sectional plane is increased, it becomes possible to achieve further downsizing of the illumination device 104.

Although the illumination devices and the projectors according to the embodiments of the invention are explained hereinabove, the invention is not limited to the embodiments described above, but can be put into practice in various forms within the scope or the spirit of the invention, and the following modifications, for example, are also possible.

1. Although in the first embodiment described above, the electro-optic modulation devices (the liquid crystal light modulation devices) for the wide vision with the aspect ratio of the image forming area of 9:16 are used, the invention is not limited thereto, but can be applied to the electro-optic modulation device with the aspect ratio of the image forming area of, for example, 3:4.

2. Although in the first embodiment described above, the case in which the first small lenses of the first lens array are arranged in five rows and four columns is exemplified for the explanation, the invention is not limited thereto, but can be applied to the case in which the first lens array is divided into different division numbers.

3. Although in each of the embodiments described above, the secondary mirror is used as the reflecting section disposed in the light emitting tube, the invention is not limited thereto, but a reflecting film can preferably be used as the reflecting section.

4. Although in the second and third embodiments described above, the solid-core rod is used as the integrator rod, the invention is not limited thereto, but a hollow rod (e.g., a rod made by bonding four reflecting mirrors with each other) can also be used.

5. Although the projector 1000 according to the first embodiment described above is the transmissive projector, the invention is not limited thereto. The invention can also be applied to a reflective projector. It should be noted here that "transmissive" denotes that the electro-optic modulation device as the light modulation section is a type of transmitting a light beam such as a transmissive liquid crystal light modulation device, and "reflective" denotes that the electro-optic modulation device as the light modulation section is a type of reflecting a light beam such as a reflective liquid crystal light modulation device. Also in the case in which the invention is applied to the reflective projector, the same advantages as in the case with the transmissive projector can be obtained.

6. Although in the first embodiment described above, the projector using the three liquid crystal light modulation devices 400R, 400G, and 400B is exemplified for the explanation, the invention is not limited thereto, but can be applied to the projector using one, two, or more than four liquid crystal light modulation devices.

7. The invention can be applied to a front projection projector for performing projection from the side of observing the projected image, and also to a rear projection projector for performing projection from the side opposite to the side of observing the projected image.

The entire disclosure of Japanese Patent Application No. 2007-217998, filed Aug. 24, 2007 is expressly incorporated by reference herein.

What is claimed is:

1. An illumination device comprising:
a light source device including an ellipsoidal reflector with a reflecting concave surface and a light emitting tube having an emission center in the vicinity of a first focal position of the ellipsoidal reflector,
an integrator rod that converts the illumination light beam from the light source device into light having a more uniform in-plane light intensity distribution,
wherein:
defining a first focal position and a second focal position of the ellipsoidal reflector in a cross-sectional plane in a first virtual plane including a center axis of the ellipsoidal reflector as $F_1$ and $F_2$, respectively, and defining a first focal position and a second focal position of the ellipsoidal reflector in a cross-sectional plane in a second virtual plane including a center axis of the ellipsoidal reflector and perpendicular to the first virtual plane as $F_1'$ and $F_2'$, respectively, the ellipsoidal reflector has a rotationally asymmetrical concave shape having $F_1$ and $F_1'$ at the same position, and $F_2$ located between the $F_2'$ and the ellipsoidal reflector, the integrator rod is configured to have a size of a light entrance surface of the integrator rod in a direction perpendicular to the first virtual plane larger than a size of the light entrance surface of the integrator rod in a direction perpendicular to the second virtual plane, $F_2$ is located at the light entrance surface of the integrator rod, and $F_2'$ is located at a position within the integrator rod.

2. The illumination device according to claim 1, wherein defining a diameter size of the ellipsoidal reflector in the cross-sectional plane in the first virtual plane as D, and defining a diameter size of the ellipsoidal reflector in the cross-sectional plane in the second virtual plane as D', the ellipsoidal reflector has a shape with a part of the reflecting concave surface being removed so as to satisfy D<D'.

3. The illumination device according to claim 1, wherein the light source device further includes one of a secondary mirror and a reflecting film that reflects the light, which is emitted from the light emitting tube towards an area to be illuminated, towards the light emitting tube.

4. The illumination device according to claim 2, wherein the light source device further includes one of a secondary mirror and a reflecting film that reflects the light, which is emitted from the light emitting tube towards an area to be illuminated, towards the light emitting tube, and the one of the secondary mirror and the reflecting film is configured to reflect the light, which is emitted from the light emitting tube towards an area from which the part of the reflecting concave surface of the ellipsoidal reflector has been removed, towards the light emitting tube.

5. The illumination device according to claim 1, further comprising:

a concave lens that emits the illumination light beam from the light source device towards an area to be illuminated, wherein defining refractive power of the concave lens in the first virtual plane as $\rho$, and defining refractive power of the concave lens in the second virtual plane as $\rho'$, $\rho>\rho'$ is satisfied.

6. The illumination device according to claim 1, further comprising:

a cylindrical lens disposed between the light source device and the integrator rod, and having a function of enlarging an incident angle of light entering the integrator rod in the second virtual plane.

7. A projector comprising:

the illumination device according to claim 1;

an electro-optic modulation device that modulates the illumination light beam from the illumination device in accordance with image information; and a projection optical system that projects the light modulated by the electro-optic modulation device.

8. The projector according to claim 7, wherein defining a diameter size of the ellipsoidal reflector in the cross-sectional plane in the first virtual plane as D, and defining a diameter size of the ellipsoidal reflector in the cross-sectional plane in the second virtual plane as D', the ellipsoidal reflector has a shape with a part of the reflecting concave surface being removed so as to satisfy D<D'.

9. The projector according to claim 7, wherein the light source device further includes one of a secondary mirror and a reflecting film that reflects the light, which is emitted from the light emitting tube towards an area to be illuminated, towards the light emitting tube.

10. The projector according to claim 8, wherein the light source device further includes one of a secondary mirror and a reflecting film that reflects the light, which is emitted from the light emitting tube towards an area to be illuminated, towards the light emitting tube, and the one of the secondary mirror and the reflecting film is configured to reflect the light, which is emitted from the light emitting tube towards an area from which the part of the reflecting concave surface of the ellipsoidal reflector has been removed, towards the light emitting tube.

11. The projector according to claim 7, further comprising:

a concave lens that emits the illumination light beam from the light source device towards an area to be illuminated, wherein defining refractive power of the concave lens in the first virtual plane as $\rho$, and defining refractive power of the concave lens in the second virtual plane as $\rho'$, $\rho>\rho'$ is satisfied.

12. The projector according to claim 7, further comprising:

a cylindrical lens disposed between the light source device and the integrator rod, and having a function of enlarging an incident angle of light entering the integrator rod in the second virtual plane.

* * * * *